United States Patent
Boyle, Jr.

[15] 3,660,871
[45] May 9, 1972

[54] UNIVERSAL BEAM CLAMP

[72] Inventor: William Joseph Boyle, Jr., New Orleans, La.

[73] Assignee: Delta Marine Contr. Division of Unitec Industries, Inc., Baltimore (Cockeysville), Md.

[22] Filed: Aug. 26, 1970

[21] Appl. No.: 67,048

[52] U.S. Cl. ............................24/73 R, 24/263 FS, 248/221
[51] Int. Cl. .........................................................A44b 21/00
[58] Field of Search .............24/81 PB, 73 R, 243 AB, 243 B, 24/243 S, 263 A, 263 FS, 73; 248/221, 236, 228, 235, 245, 226 A, 226 B, 243

[56] References Cited

UNITED STATES PATENTS

| | | | |
|---|---|---|---|
| 2,348,954 | 5/1944 | Brown et al. | 248/221 |
| 621,172 | 3/1899 | Stikeman | 248/245 |
| 3,445,081 | 5/1969 | Roussos | 248/228 X |
| 2,555,782 | 6/1951 | Brownstein | 248/221 |
| 2,573,086 | 10/1951 | Yoshimoto | 248/235 |
| 3,469,810 | 9/1969 | Dorris | 248/245 X |

Primary Examiner—Donald A. Griffin
Attorney—Oberlin, Maky, Donnelly & Renner

[57] ABSTRACT

Universal beam clamp includes two clamping jaws, one movable relative to the other for securing the clamp to both vertical and horizontal support structures. The relatively stationary jaw has an oversize slot to permit engagement with flanges of different thicknesses, and one or more leveling screws may be provided for adjusting the angular orientation of the clamp with respect to the support structure. The movable jaw desirably consists of an annular disc or plate which provides a clamping surface around its entire periphery and is carried by a threaded shaft extending through an aperture in the base of the stationary jaw adjacent the slot therein for movement toward and away from the stationary jaw upon tightening and loosening of a nut threaded onto the other end of the shaft. The load may be directly supported by the clamp or suspended therefrom, and a handrail mount may be provided on each side of the clamp to permit support of a handrail in any position of the clamp.

10 Claims, 8 Drawing Figures

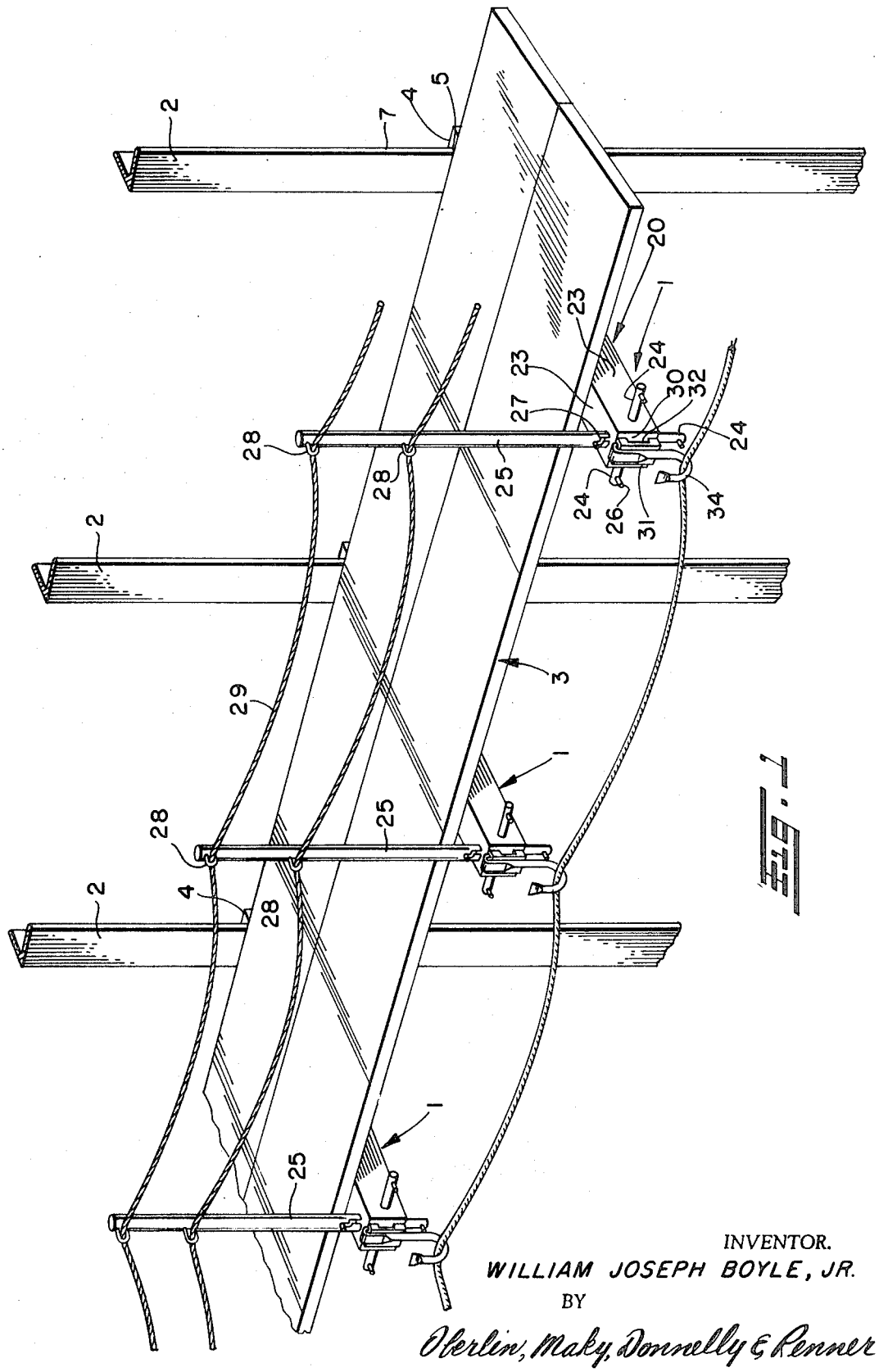

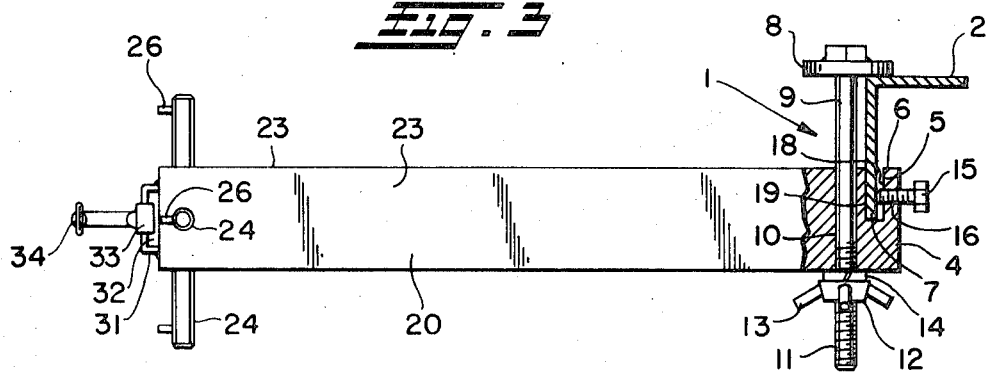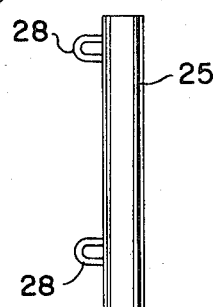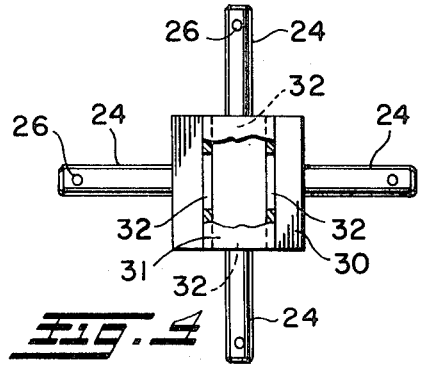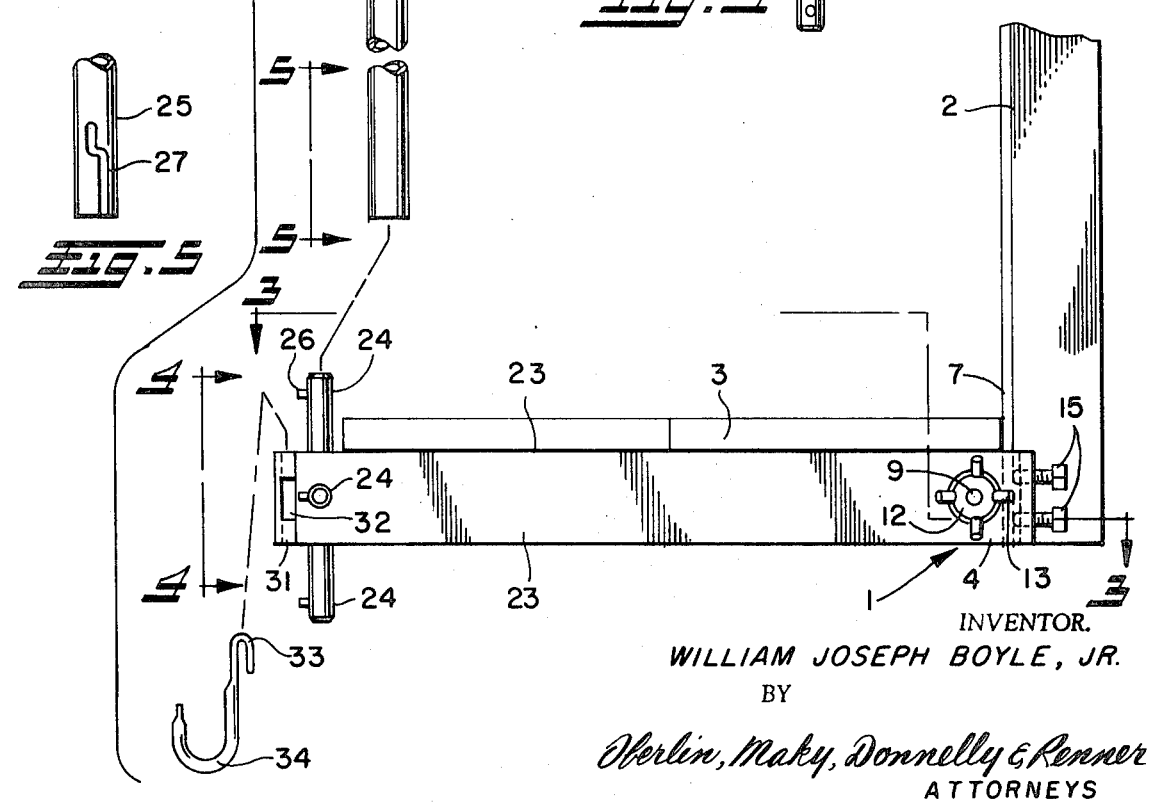

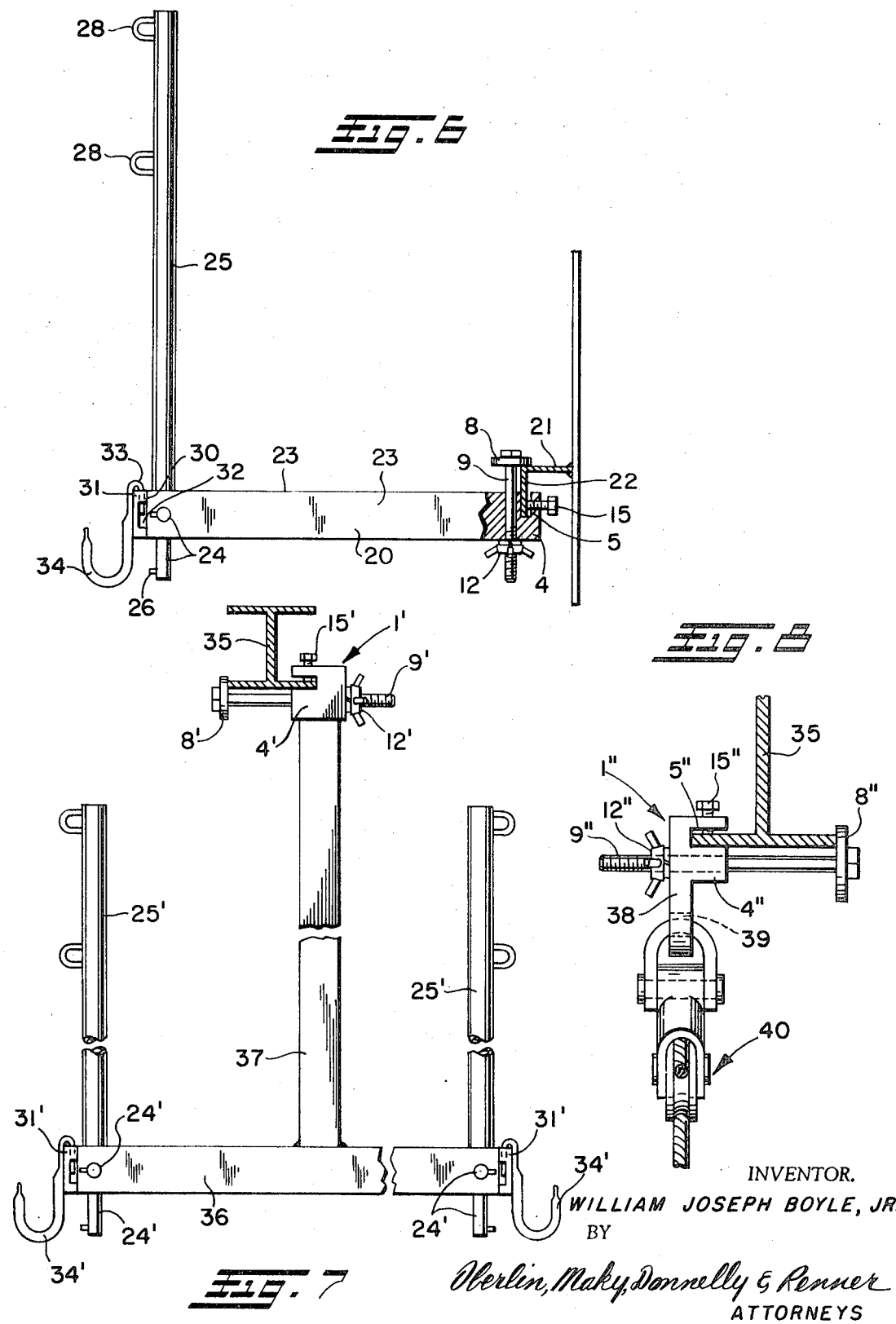

UNIVERSAL BEAM CLAMP

The present invention relates generally as indicated to a universal beam clamp, and more particularly, to certain improvements in beam clamps for ready attachment to support structures of various sizes and shapes, including I-beams, angles, channels, and tees which may extend vertically, horizontally, or even be inclined.

Previous known beam clamps were usually too restrictive in their use, being limited to use with specific sizes and shapes of structural support members, and generally they could only be used with horizontal or vertical support members but not both. Most clamps were also more complex and costly than desired, and because of their relatively large size and weight, they were not suitable for certain applications where space and weight limitations were an important factor. Still other clamps required special tools for assembly and disassembly, and could not be quickly and easily installed and removed.

More recently, some clamps have been devised which overcome many of the drawbacks of previous known clamps mentioned above, but there is still a definite need for an improved clamp of relatively simple design which is highly reliable and may be quickly and easily mounted on a variety of structural shapes and sizes having different angular orientations, which is a principal object of this invention.

Another object is to provide such a clamp which may readily be installed in relatively confined areas without the use of special tools and the like.

Still another object is to provide such a clamp which only requires the tightening of the movable jaw to secure the clamp to a support structure, and without having to orient the movable jaw with respect to the support structure prior to tightening.

These and other objects of the present invention may be achieved by providing the clamp with two clamping jaws, one which is movable relative to the other for clamping of the support structure therebetween. The relatively stationary jaw is slotted for engagement with a flange on the support structure, and the movable jaw consists of an annular disc or plate which is carried by a threaded shaft extending through an aperture in the base of the stationary jaw for movement toward and away from the stationary jaw upon tightening of a nut threaded onto the opposite end of the shaft.

The annular clamping plate provides a clamping surface around its entire periphery, thus eliminating the need for having to orient the clamping plate with respect to the support structure prior to tightening, and the slot in the stationary jaw may be made oversize to permit use on flanges of different sizes and thicknesses. Leveling screws may be used to orient the clamp with respect to the support structure, which may extend vertically, horizontally or be inclined. A load may be directly supported by the clamp or suspended therefrom in suitable manner, and suitable means may also be provided on the clamp for attachment of a post, hook, or other device to the clamp regardless of the particular orientation of the clamp and support structure therefor.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In the annexed drawings:

FIG. 1 is an isometric view of a plurality of universal beam clamps constructed in accordance with the present invention shown being used to support scaffolding and the like from vertical support beams;

FIG. 2 is an enlarged exploded side elevation view of one of the clamps of FIG. 1 showing the railing and hook disassembled from the clamp;

FIG. 3 is a partial section through the clamp of FIG. 2 taken on the plane of the line 3—3 thereof;

FIG. 4 is an enlarged end view of the clamp as seen from the plane of the line 4—4 at the left end of FIG. 2, with portions of the hook mounting plate broken away to show the slots therein for receipt of the end of the hook regardless of the position of the clamp;

FIG. 5 is a fragmentary elevation view of the lower end of the railing of FIG. 2 as seen from the plane of the line 5—5 thereof;

FIG. 6 is an enlarged side elevation view of one of the clamps of FIG. 1, but showing the clamp mounted on a horizontal support structure;

FIG. 7 is an enlarged side elevation view of a modified form of clamp which is similar to the clamps previously illustrated except that the clamp is shown attached to an overhead support member and has a downward extension for supporting a horizontal support member beneath the clamp; and FIG. 8 is an enlarged side elevation view of still another form of clamp in accordance with this invention which only differs from the clamps previously illustrated in the provision of a lifting pad for attachment of a lift mechanism to the clamp.

Referring now in detail to the drawings, in FIG. 1 there is illustrated by way of example several universal beam clamps 1 constructed in accordance with this invention mounted on suitable support members such as the vertical support beams 2 shown for use in supporting scaffolding 3 and the like. As best seen in FIGS. 2 and 3, each beam clamp 1 consists of a stationary jaw 4 which may be in the form of a rectangular block of steel having a transverse slot 5 extending across one face 6 for engagement with the flange 7 of the support beam 2 and a movable jaw 8 desirably in the form of an annular disc or plate supported for movement toward and away from the stationary jaw 4 by a shaft 9 extending through a hole 10 in the stationary jaw adjacent the slot.

The shaft 9 is threaded over a substantial portion of its length from the projecting end 11 for threaded engagement by a nut 12 which when tightened draws the movable jaw 8 toward the stationary jaw for clamping onto a support structure disposed therebetween. Handle extensions 13 may be provided on the nut to facilitate tightening thereof, and a lock washer 14 may be disposed on the shaft 9 between the nut 12 and stationary jaw 4 to prevent loosening of the nut due to vibrations and the like.

To permit utilization of the clamp 1 on flanges 7 of different thicknesses, the slot 5 is made oversize, and two leveling screws 15 are desirably threadedly received in tapped openings 16 extending into the slot through one side 18 for tightening of the leveling screws into engagement with the flange to obtain the desired leveling of the clamp. As an example, the slot 5 may be approximately 2 inches deep and ⅞ inch wide for use on flanges ranging from approximately ¼ to ¾ inch in thickness. The length of the shaft 9 on which the movable clamping disc 8 is mounted may also be varied to suit conditions but it is desirably approximately 10 inches long, and the dimension of the stationary jaw 4 through which the shaft 9 extends is desirably approximately 3 inches to permit attachment of the clamp to flanges ranging from 2 to 8 inches wide, whether they be I-beams, angles or channels toeing either way, or tees.

Effective holding of the clamp 1 to a suitable support structure is assured by locating the axis of the shaft 9 relatively close to the side 19 of the slot 5 opposite the leveling screws 15 and centered with respect to the width of the stationary jaw member 4, and making the annular clamping disc 8 of sufficient diameter to radially overlap the slot 5. As an example, the axis of the shaft 9 may be located approximately 1 inch from the adjacent side 19 of the slot 5, and the annular disc 8 may be approximately 4 to 5 inches in diameter to obtain the desired radial overlap with the slot. Moreover, because the movable jaw 8 is in the form of an annular disc as aforesaid, the need for having to orient the movable jaw with respect to the support structure to be clamped thereby is eliminated, since the annular disc affords holding around its entire periphery.

If the clamp 1 is to be used to support a scaffolding 3 or similar type load, a suitable support member 20 may be directly secured to the end of the stationary jaw 4 opposite the leveling screws. In FIGS. 1 through 3 and 6, the support member 20 shown is in the form of an elongated tube of square cross section approximately 3 inches on a side having one end welded to the end of the stationary jaw member 4, whereby whether the clamp 1 is secured to a vertically extending support structure 2 with the vertical flange 7 extending right or left as viewed in FIG. 1, or is secured to a horizontally extending support structure 21 with the horizontal flange 22 extending either up or down as viewed in FIG. 6, one of the sides 23 of the support member 20 will be disposed horizontally for supporting the scaffolding 3.

Adjacent the other end of the tubular support member 20 each of the sides 23 may have a relatively short pipe or shaft 24 extending outwardly therefrom for insertion of the lower hollow end of a railing post 25 thereover. As best seen in FIGS. 1, 2 and 5, each support shaft 24 has a radial pin 26 projecting therefrom for receipt in a slot 27 in the lower end of each railing 25. The slot 27 generally extends vertically but is horizontally stepped intermediate its length to permit locking of the railings to the support shafts by pushing down on the railings and rotating them within the horizontal stepped portion to force the pins 26 into the uppermost portions of the slots 27.

Metal rings or loops 28 may be welded to the railings 25 for passage of a railing rope or cable 29 therethrough as shown in FIG. 1. In addition, the outermost end 30 of the support member 20 may have a hook mounting plate 31 secured thereto with slots 32 on all four sides for receipt of the reversely bent end 33 of a hook 34 regardless of the orientation of the clamp. The hooks 34 may be used to support power hoses, cables, and other material adjacent the walkway as shown in FIG. 1.

In FIG. 7 there is shown a modified form of universal beam clamp 1' in accordance with this invention which is substantially identical to the beam clamp 1 previously described except that the clamp is secured to an overhead I-beam or tee 35, and the tubular support 36 for the scaffolding is suspended beneath the clamp by a vertical extension 37 welded or otherwise secured to the end of the stationary jaw 4' opposite the leveling screws 15'. The tubular support 36 may extend horizontally beyond one or both sides of the extension 37, and the outermost ends of the tubular support 36 may be provided with the usual support shafts 24' for the railings 25' and slotted mounting plates 31' for the hooks 34' as previously described.

The universal beam clamp 1" illustrated in FIG. 8 is also of a construction substantially identical to the beam clamp 1 previously described, but in place of the tubular support 20, a lifting pad 38 is welded or otherwise secured to the end of the stationary jaw 4" opposite the leveling screws 15". An aperture 39 may be provided in the lifting pad 38 to facilitate attachment of a pulley 40 or other device for use of the clamp as a lifting lug. Otherwise, the details of construction and operation of the clamps 1' and 1" of FIGS. 7 and 8 are substantially the same as the beam clamp 1 previously described, and the same reference numerals followed by prime symbols are used to designate like parts.

From the foregoing, it will now be apparent that the universal beam clamp of the present invention is of a simple yet versatile design which allows it to be used to support scaffolding and other loads from both horizontal and vertical support structures of different shapes and sizes, and the clamp may also be secured to inclined structures as well. The annular clamping disc which is the movable jaw also greatly facilitates ease of assembly of the clamp, since it affords a holding surface around its s entire periphery and does not have to be oriented with respect to the support structure to be clamped thereby. Nor are any special tools required to assemble or disassemble the clamp; however, a wrench may be needed for tightening and loosening the leveling screws:

I, therefore, particularly point out and distinctly claim as my invention:

1. A clamp for attachment to a flange of a support structure comprising a stationary jaw having a slot therein for receipt of such flange, such stationary jaw on one end carrying a support member for scaffolding and the like, a movable jaw, means mounting said movable jaw for movement toward and away from said stationary jaw for clamping such structural member between said jaws and releasing the same, said movable jaw comprising an annular plate which radially overlaps said slot in said stationary jaw, said annular plate providing a clamping surface around its entire periphery to eliminate the need for having to orient the movable jaw with respect to the support structure prior to clamping, means for mounting a railing post adjacent one end of said support member, and a hook mounting plate on said one end of said support member having four sides which define slots for receipt of the end of a downwardly depending hook regardless of which side of said support member is facing up, thereby permitting attachment of said clamp to both vertical and horizontal support structures.

2. A clamp for attachment to a flange of a support structure comprising a stationary jaw having a slot therein for receipt of such flange, said stationary jaw having a vertical extension for suspending a support member for scaffolding and the like beneath said clamp when the same is secured to an overhead support structure, said support member extending beyond both ends of said extension and having means adjacent both ends for attachment of railing posts to said support member, a movable jaw adjacent said stationarily jaw, and means mounting said movable jaw for movement toward and away from said stationary jaw for clamping such structural member between said jaws and releasing the same, said movable jaw comprising an annular plate which radially overlaps said slot in said stationary jaw, said annular plate providing a clamping surface around its entire periphery, thereby eliminating the need for having to orient the movable jaw with respect to the support structure prior to clamping.

3. A clamp for attachment to a support structure comprising a solid one piece stationary jaw having a slot in one surface thereof to receive a first portion of said support structure, a support member for scaffolding and the like of rectangular tubular cross-section connected to one end of said stationary jaw, and a movable jaw having an annular plate adapted to move toward and away from said slot to engage or release, respectively, a second portion of said support structure, which second portion is contiguous with or extends beyond said one surface, said annular plate without obstruction being adapted radially to overlap said slot in abutment with said one surface, whereby said support structure may always be clamped by said two jaws.

4. The clamp of claim 3 further including means mounting said movable jaw for such movement, said means comprising a shaft extending through a hole in said stationary jaw adjacent one side of said slot, said annular plate being carried by one end of said shaft, and a nut threadedly engaging the other end of said shaft which when tightened draws said annular plate toward said stationary jaw.

5. The clamp of claim 3 wherein said slot is made oversize for receipt of flanges of different thicknesses, and leveling screws are threadedly received in tapped openings extending into said slot through one side thereof for engagement with the flange upon tightening of said screws.

6. The clamp of claim 5 wherein said slot is of sufficient width to receive flanges ranging from approximately one-quarter to three-quarter inch in thickness.

7. The clamp of claim 3 further comprising a lifting pad secured to one end of said stationary jaw.

8. The clamp of claim 3 further comprising a support member carried by one end of said stationary jaw for supporting scaffolding and the like, and means for mounting a railing post adjacent one end of said support member.

9. The clamp of claim 8 wherein said support member is of rectangular section having flat sides, and means are provided on each side of said support member adjacent said one end for attachment of an upwardly extending railing post to said support member regardless of which side is facing up, thereby permitting said clamp to be secured to both vertical and horizontal support structures.

10. The clamp of claim 9 wherein said means for attachment of a railing post to each side of said support member comprises shafts extending outwardly from each side of said support member, each shaft having a radial pin projecting therefrom, the lower end of said railing post being of tubular section and having a generally vertical slot with a horizontal step intermediate its length for securing said railing post to said shaft by inserting said railing post over said shaft with said slot in alignment with said pin and engaging said pin in the uppermost portion of said vertical slot.

* * * * *